(12) United States Patent
Moulon et al.

(10) Patent No.: US 10,800,515 B2
(45) Date of Patent: Oct. 13, 2020

(54) LOWER ATTACHMENT SYSTEM FOR A TRIMMABLE HORIZONTAL STABILISER ACTUATOR

(71) Applicant: Goodrich Actuation Systems SAS, Buc (FR)

(72) Inventors: Thomas Moulon, Cergy Pontoise (FR); Quentin Ricard, Cergy Pontoise (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 0 days.

(21) Appl. No.: 15/964,109

(22) Filed: Apr. 27, 2018

(65) Prior Publication Data

US 2018/0334239 A1 Nov. 22, 2018

(30) Foreign Application Priority Data

May 19, 2017 (EP) .................................... 17305590

(51) Int. Cl.
*B64C 13/28* (2006.01)
*F16H 25/20* (2006.01)
(Continued)

(52) U.S. Cl.
CPC .............. *B64C 13/28* (2013.01); *B64C 5/16* (2013.01); *B64C 13/42* (2013.01); *F16H 25/205* (2013.01); *F16H 25/2472* (2013.01)

(58) Field of Classification Search
CPC .. B64C 5/10; B64C 5/16; B64C 13/20; B64C 13/28; B64C 13/341; F16H 25/205; F16H 25/2472; F16H 2035/103
(Continued)

(56) References Cited

U.S. PATENT DOCUMENTS 1,907,374 A * 5/1933 Atta ........................ B64C 13/00
244/87
6,928,895 B2 * 8/2005 Davies ..................... B64C 9/02
49/139

(Continued)

FOREIGN PATENT DOCUMENTS

DE 102011119946 A1 6/2013
EP 1283384 A2 2/2003

OTHER PUBLICATIONS

Extended European Search Report for International Application No. 17305590.6 dated Oct. 30, 2017, 8 pages.

*Primary Examiner* — Bobby Rushing, Jr.
(74) *Attorney, Agent, or Firm* — Cantor Colburn LLP

(57) ABSTRACT

A lower attachment system for a trimmable horizontal stabiliser actuator comprising: a ballnut for being disposed on a screwshaft of the actuator and forming a part of a primary load path of the lower attachment system; a trunnion connected to the ballnut and forming a part of the primary load path of the lower attachment system; a failsafe plate disposed about the trunnion and forming a part of a secondary load path; a secondary connection connected to the failsafe plate and forming a part of the secondary load path; a sheet plate attached to a first mounting point on the secondary connection and a second mounting point on the ballnut; and an adjustment mechanism provided with the sheet plate for adjusting the size or position of the sheet plate to adapt it to fit a distance between the first and second mounting points.

10 Claims, 11 Drawing Sheets

(51) Int. Cl.
    *B64C 13/42*     (2006.01)
    *F16H 25/24*     (2006.01)
    *B64C 5/16*     (2006.01)

(58) Field of Classification Search
    USPC .............................................. 244/99.4, 99.9
    See application file for complete search history.

(56) References Cited

U.S. PATENT DOCUMENTS

| | | |
|---|---|---|
| 8,496,204 B1 | 7/2013 | Charafeddine |
| 8,702,034 B2 * | 4/2014 | Moulon .................. B64C 13/28 |
| | | 244/99.2 |
| 8,910,917 B1 * | 12/2014 | Bees ........................ F16M 7/00 |
| | | 248/657 |
| 2016/0280356 A1 * | 9/2016 | Medina ................... B64C 13/28 |
| 2016/0281826 A1 * | 9/2016 | Medina ............... F16H 25/2025 |
| 2017/0036754 A1 | 2/2017 | Medina et al. |
| 2018/0045291 A1 * | 2/2018 | Teyssier ................... F16D 9/06 |

\* cited by examiner

Primary load path

25

32

Secondary load path

25

32

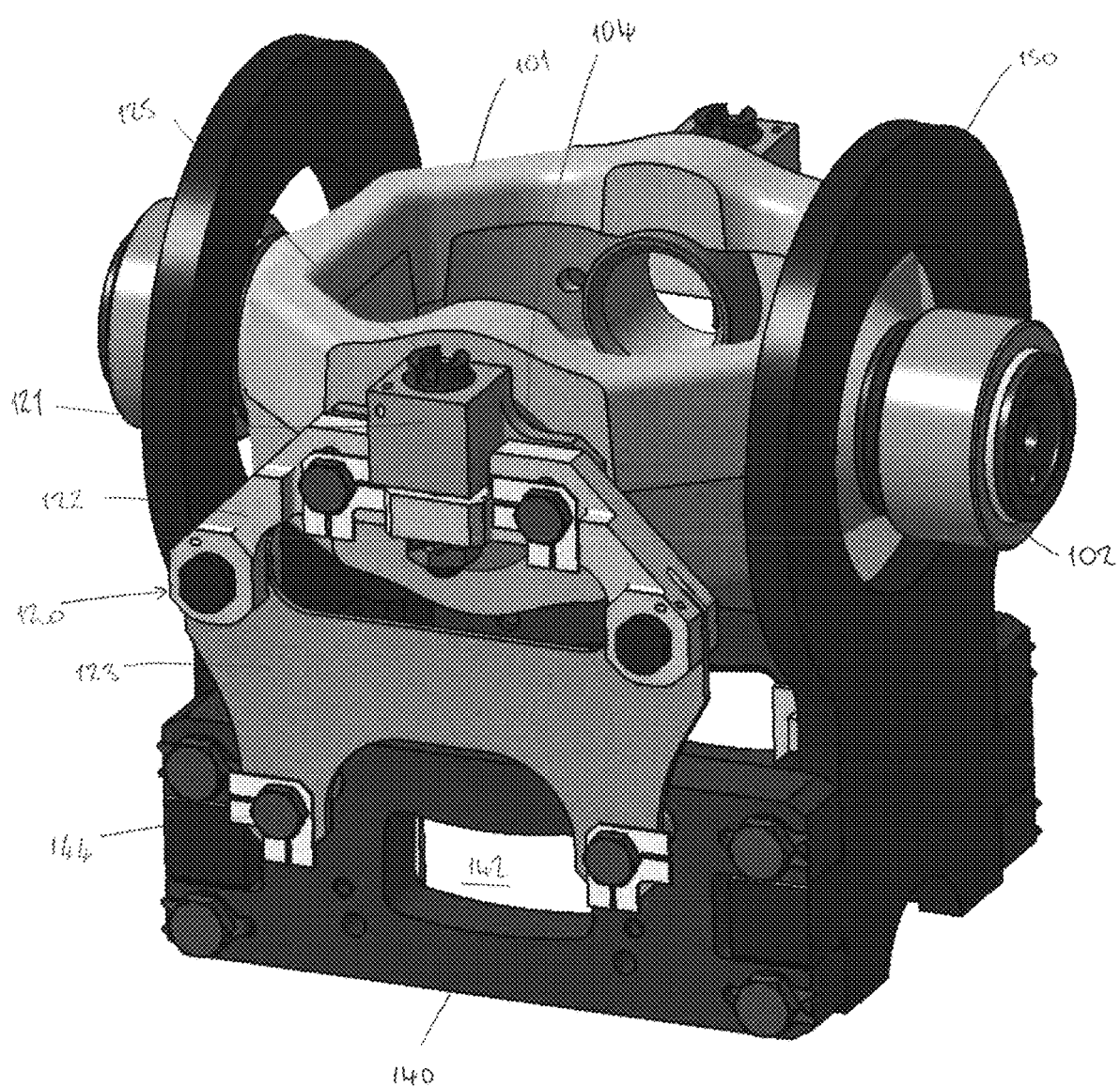

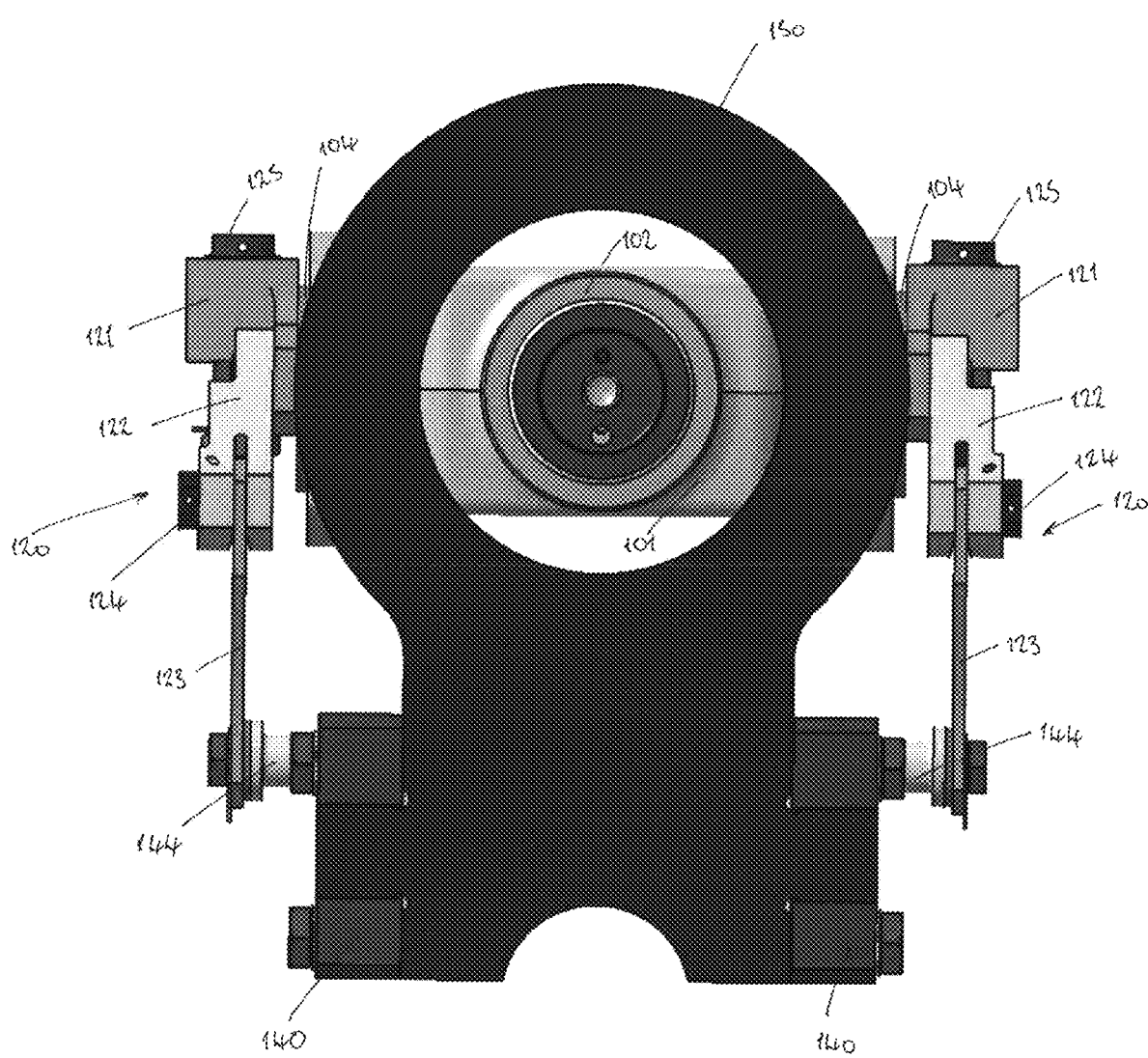

B - B

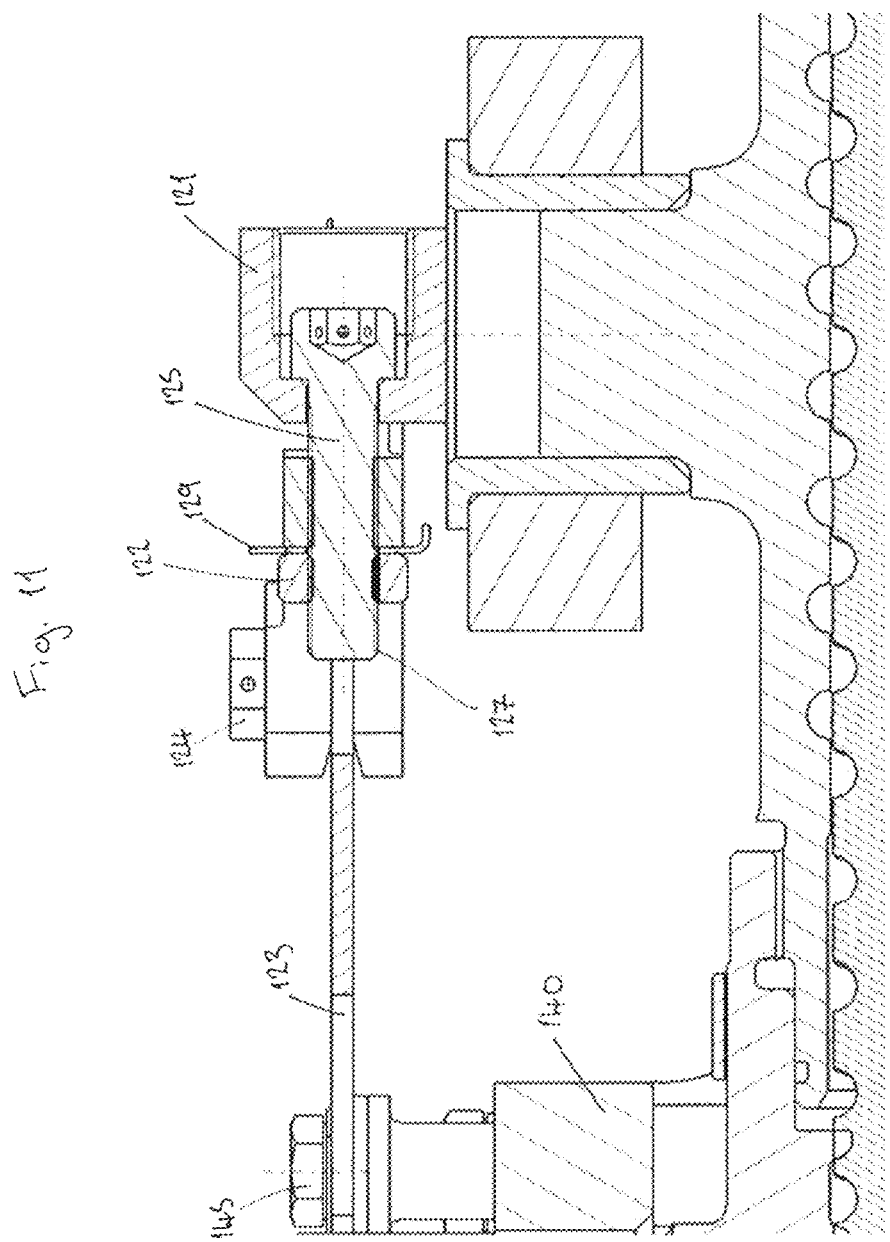

LOWER ATTACHMENT SYSTEM FOR A TRIMMABLE HORIZONTAL STABILISER ACTUATOR

FOREIGN PRIORITY

This application claim priority to European Patent Application No. 17305590.6 filed May 19, 2017, the entire contents of which is incorporated herein by reference.

TECHNICAL FIELD

The invention relates to a lower attachment system for a flight actuator such as a trimmable horizontal stabiliser actuator (THSA). In particular, it relates to adaptations to a sheet plate for use in a THSA that has a primary load path and a secondary load path.

BACKGROUND

It is well known for a flight actuator to include two mechanical load paths, one primary and the other secondary, with the latter intended to take up the load when the primary path has failed. In a typical prior art device, as shown in FIG. 1, when operating on the primary load path the loads are transmitted through a hollow ball or roller screw. The hollow screw houses a safety rod, also called a failsafe bar or tie bar, which is connected to the screw with a small amount of play. During normal operation of the screw, when the primary load path is working correctly, the secondary load path formed by this tie bar carries no load since there is no contact due to the small amount of play. However, in the event of a failure of the screw in the primary load path then the tie bar performs its failsafe function and ensures continuity of the transmission of loads by the actuator.

With reference to FIG. 1 a typical known flight control actuator of the trimmable horizontal stabiliser actuator (THSA) type includes a primary load path with a hollow screw 32 connected at its upper end to the aircraft via a Cardan joint system 24 joining with first aircraft structural elements S1. The primary load path further incorporates a nut assembly 25 mounted on the screw 32, and the nut assembly 25 is connected to the stabiliser 22 of the aircraft, this connection being achieved for example by another Cardan joint system 26.

As mentioned above, the secondary load path is provided by means of a tie bar 29 which is within the screw 32. The tie bar 29 is terminated at its upper end by a male portion, in this case taking the form of a spherical head 27, which is mounted within a female portion on a fastening piece 28, in this case taking the form of a recess 210. The fastening piece 28 is connected to the structure of the aircraft via second aircraft structural elements S2. The known system may also include some means for preventing motion of the nut assembly 25 relative to the screw 32 and/or for fixing the stabiliser 22/Cardan joint 26 in place when the primary load path fails. Thus, the lower attachment, of which the nut assembly 25 is a part, could also include secondary load path elements used when the primary load path fails.

In the example known upper attachment shown in FIG. 1 it will be understood that should the screw 32 fails then load can be carried by the secondary load path since movement of the spherical head 27 is restricted by the upper and lower shoulders of the recess 210. Consequently, the stabiliser 22 can either be safely held in a single position (in the case where the lower attachment locks in place) or in some prior art arrangements it might be permitted to continue normal movement should the tie bar 29 be connected with the screw 32 in such a way as to permit continued rotation of the screw 32 even after failure preventing it from carrying axial loads.

One possible arrangement for primary and secondary load paths in a THSA is shown in FIG. 2. A horizontal stabiliser 22 is connected by stabiliser arms and bushings to a nut assembly 25 which connects it to a screw 23. In this case the nut assembly 25 includes a gimbal assembly with primary gimbal trunnions and a gimbal ring connected to primary ball nut trunnions and a ball nut body, which is coupled via balls to the screw shaft of the screw 23. The nut assembly 25 forms the lower attachment of the actuator in the primary load path. At the upper end of the actuator a joint system such as a Cardan joint system 24 will typically include no back elements along with the primary load path gimbal, which is coupled to the aircraft structure. During normal use, without any failure, the loading for the actuator is carried via the primary path.

In the event of a failure of the primary path the loading is transferred to the secondary path. In this example at the lower attachment the horizontal stabiliser 22 is connected by the stabiliser arms and the bushings to a secondary load path lower attachment 35 comprising failsafe plates and transfer plates coupled via secondary nut trunnions and a secondary nut body to secondary nut threads which are joined to the thread of the screw 23 when the secondary load path is engaged. Typically the secondary nut threads would be arranged to lock with the threads of the screw 23 preventing movement of the horizontal stabiliser 22 when the secondary load path is engaged. From the lower attachment 35 the load in the secondary load path is transmitted via the screw 23 along the tie bar tube/rod 29 through the male end of the tie bar rod, which in this example is a tie bar sphere 27, and to the secondary load path upper attachment 20.

Examples of the primary and secondary load paths are shown in FIGS. 3A and 3B. The primary load path is shown in FIG. 3A, while the secondary load path is shown in FIG. 3B wherein the detour taken by the secondary load path through the lower attachment is evident.

Typically, the lower attachment includes a sheet plate which, when the primary load path is functioning normally, keeps the secondary load path unloaded. It achieves this by maintaining a clearance between the failsafe plates and the stabiliser arms and bushings. In the event of failure of the primary load path, the sheet plate breaks and allows loading of the secondary load path. Particularly, the breaking of the sheet plate results in the clearance between the failsafe plate and the bushings closing, and the failsafe plate then transfers load to the bushings and stabiliser arms. Therefore, the sheet plate is a complicated component.

Further, THSAs are typically fitted with a detection device to detect failure of the primary load path and loading of the secondary load path. The sheet plate must not interfere with the operation of the detection device. Alternatively, inspection of the sheet plate can provide information about failure of the primary load path e.g. if it is broken.

Consequently, the manufacture of a sheet plate can be expensive, and it can be time-consuming to install correctly in the lower attachment. Typically sheet plates of various sizes are available and the best fit is chosen to maintain the desired clearance.

SUMMARY

According to a first aspect of the invention there is provided a lower attachment system for a trimmable horizontal stabiliser actuator comprising: a ballnut for being disposed on a screwshaft of the actuator and forming a part of a primary load path of the lower attachment system; a trunnion connected to the ballnut and forming a part of the primary load path of the lower attachment system; a failsafe plate disposed about the trunnion and forming a part of a secondary load path; a secondary connection connected to the failsafe plate and forming a part of the secondary load path; a sheet plate attached to a first mounting point on the secondary connection and a second mounting point on the ballnut; and an adjustment mechanism provided with the sheet plate for adjusting the size and/or position of the sheet plate to adapt it to fit a distance between the first and second mounting points.

Therefore, the sheet plate sets the spacing between the first and second mounting points, and hence between the ballnut and secondary connection. Should the primary load path fail, the distance between the ballnut and secondary connection will change so that the secondary load path becomes loaded. The change in distance can then affect the sheet plate, e.g. by breaking it, and thereby providing evidence of a primary load path failure.

The adjustment mechanism may be a part of the sheet plate, or may be provided in addition to it. The sheet plate may be directly attached firstly to either of the ballnut or the secondary connection, and connected to the other of the ballnut or secondary connection at or via the adjustment mechanism. Any suitable means of attachment may be used to couple the sheet plate to the ballnut and/or secondary connection.

The adjustment mechanism may comprise: a coupling portion for coupling to a sheet portion of the sheet plate; and a screw mounted to the ballnut at the second mounting point and arranged to adjust the position of the coupling portion to adjust the size or position of the sheet plate.

The adjustment mechanism may comprise: a coupling portion for coupling to a sheet portion of the sheet plate; and a screw mounted to the secondary connection at the first mounting point and arranged to adjust the position of the coupling portion to adjust the size or position of the sheet plate.

Thus, the sheet plate may comprise a sheet portion such as a monolithic plate, a coupling portion which couples thereto, and a screw portion for adjusting the position of the coupling portion relative to the component on which the screw is mounted. Then, adjustment of the screw may move the coupling portion, which may then move the sheet portion. The coupling portion may be adjustable so as to adjust the position of the coupling to the sheet portion, and hence movement of the screw may be accommodated by movement of the coupling of the coupling portion and the size of the sheet plate may be adjusted. Hence, the screw may be used to adjust the size and/or position of the sheet plate The adjustment mechanism may comprise a locking mechanism for preventing changes to the size or position of the sheet plate after adjustment of the sheet plate to fit between the first and second mounting points.

Thus, once the sheet plate has been adjusted to fit the distance between the first and second mounting points, it may be locked so that it will not change during use of the THSA, thereby ensuring that any change in distance between the first and second mounting points will not be accommodated by re-adjustment of the sheet plate. Instead, the sheet plate may break, and hence evince a failure of the primary load path. The locking mechanism may be plug arranged to prevent rotation of the screw in its mount, and thereby prevent adjustment of the sheet plate.

The sheet plate may be arranged to break in case of a failure of the primary load path. Thus, failure of the primary load path will be shown by a broken sheet plate. The sheet portion of the sheet plate may be configured to break in the case of failure of the primary load path. The lower attachment system may comprising a shear pin or fuse pin coupling the sheet plate and arranged to break in case of a failure of the primary load path. Other frangible or malleable components may be used so that failure of the primary load path has an observable effect on the sheet plate.

The lower attachment system may comprise a secondary trunnion forming a part of the secondary load path and arranged to bear against the secondary connection in case of a failure of the primary load path. The secondary connection may be disposed about the secondary trunnion and may comprise an aperture for this purpose. When the secondary trunnion bears against the secondary connection, it may cause movement of the secondary connection relative to the ballnut, thereby breaking or deforming the sheet plate for example. The load from the trunnion may be transferred through the secondary connection to the failsafe plate and the trunnion.

The invention further provides a trimmable horizontal stabiliser actuator comprising a lower attachment system as described with reference to the first aspect.

According to a second aspect of the present invention there is provided a method of installing a sheet plate of a lower attachment system for a trimmable horizontal stabiliser actuator as described with reference to the first aspect, the method comprising: coupling the sheet plate to the ballnut at the second mounting point or to the secondary connection at the first mounting point; and adjusting the adjustment mechanism to adjust the size or position of the sheet plate to adapt it to fit the distance between the first and second mounting points.

The method may further comprise locking the adjustment mechanism to prevent further adjustment of the sheet plate after it has been fit to the distance between the first and second mounting points.

BRIEF DESCRIPTION OF THE DRAWINGS

An exemplary embodiment of the invention will now be described by way of example only and with reference to the accompanying drawings in which:

FIG. 4 shows a perspective view of a lower attachment system for a THSA;

FIG. 5 shows a profile view of the lower attachment system of FIG. 4;

and

Figure 10:
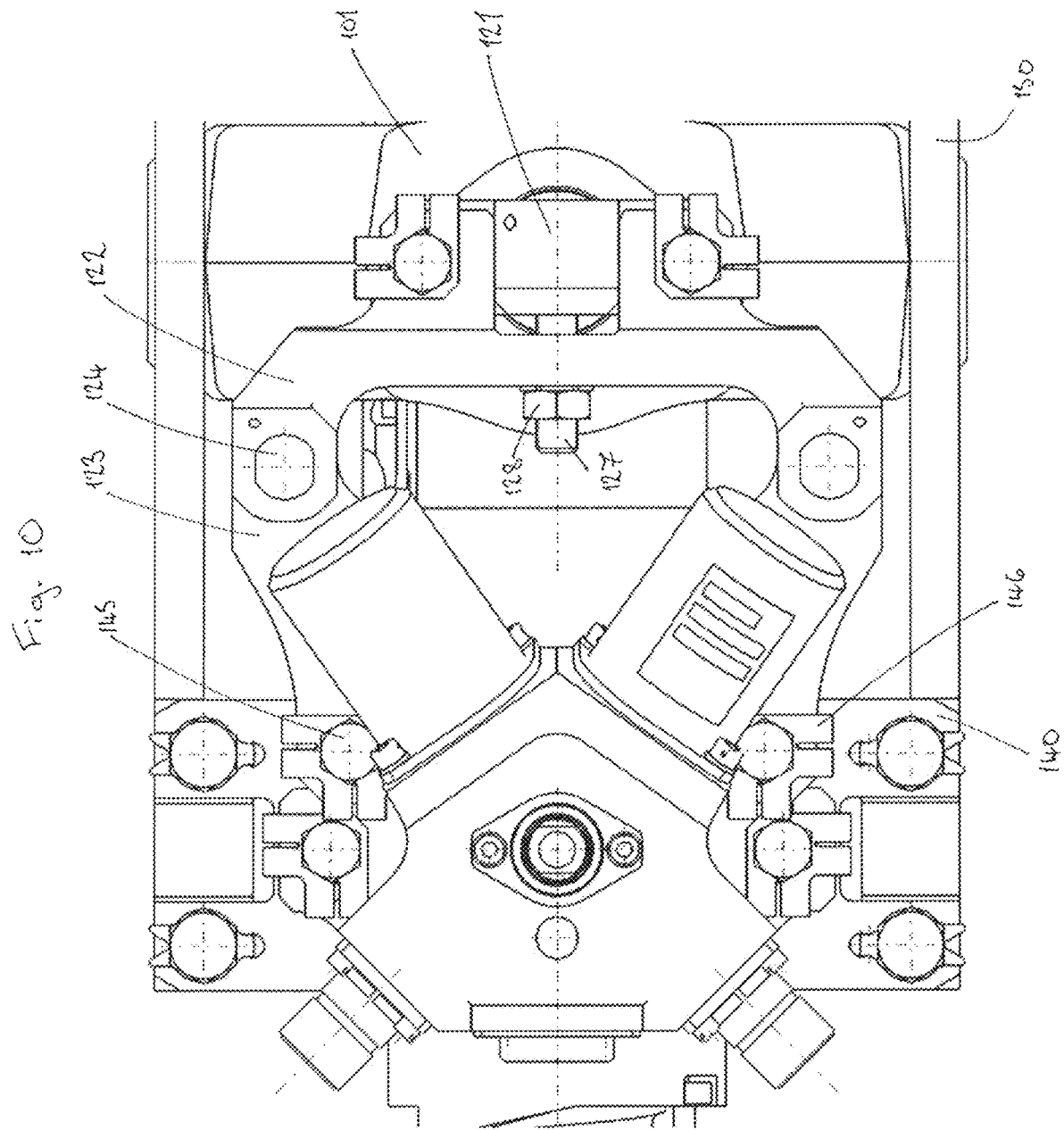
FIG. 10 shows a profile view of a lower attachment system for a THSA.

FIG. 11 shows a cross section of the lower attachment system of FIG. 10.

DETAILED DESCRIPTION

FIG. 4 shows a lower attachment system 25 for a THSA comprising a ballnut 101 with a trunnion 102, a failsafe plate 150, a secondary connection 140, and a sheet plate 120. The sheet plate 120 comprises a screw mount 121, a coupling portion 122, and a sheet portion 123. In use, a surface bracket (not shown) is pivotally mounted on the trunnion 102 so that movement of the lower attachment system 25 along a screwshaft (not shown) controls the position of the surface bracket and a flight control surface connected thereto.

During normal operation, the primary load path passes through the ballnut 101 and the trunnion 102. In the case of a failure of the primary load path, a secondary trunnion (not shown) disposed in an aperture 142 of the secondary connection 140 bears against the secondary connection and transfers load through the secondary connection 140 to the failsafe plate 150 and the surface bracket connected thereto. When the primary load path fails, the secondary connection 140 is moved by the secondary trunnion (not shown), which causes breakage of the sheet plate 120. Specifically, a fuse pin 124 coupling the sheet portion 123 to the coupling portion 122 is arranged to break in case of primary load path failure, thereby decoupling the sheet portion 123 and the coupling portion 122.

The sheet plate 120 is fixed to the secondary connection 140 at the first mounting point 144, and to the ballnut 101 at the second mounting point 104. The sheet plate 120 is mounted to the ballnut 101 via the screw mount 121 housing a screw 125. The coupling portion 122 is connected to the screw mount 121 via the screw 125 such that adjustment of the screw 125 causes movement of the coupling portion 122 relative to the screw mount 121.

The coupling portion 122 is coupled to the sheet portion 123 of the sheet plate 120, so that the sheet portion 123 is moveable by adjustment of the screw 125. Therefore, once the sheet plate 120 is attached to the ballnut 101 at the second mounting point 104 via the screw mount 121, the screw 125 may be adjusted to align the sheet portion 123 with the first mounting point 144, and the sheet portion may then be connected to the secondary connection 140 e.g. by bolts.

The sheet portion 123 may also be connected firstly to the secondary connection 140, while the coupling portion 122 is connected to the ballnut 101 via the screw mount 121. The screw 125 may then be adjusted to align the coupling portion 122 with the sheet portion 123 so that they may be coupled together e.g. by the fuse pin 124.

The sheet plate 120 thus fits the distance between the first and second mounting points 144, 104 and sets the separation of the ballnut 101 and secondary connection 140. Upon failure of the primary load path, the secondary connection 140 is moved by the secondary trunnion (not shown) bearing against it in the aperture 142, thus causing the sheet portion 123 of the sheet plate 120 to break.

FIG. 5 shows the same arrangement as depicted in FIG. 4 but from another perspective. The lower attachment system 25 comprises two sheet plates 120, one on either side of the ballnut 101. Both sheet plates 120 work in the manner described above.

Figure 1:
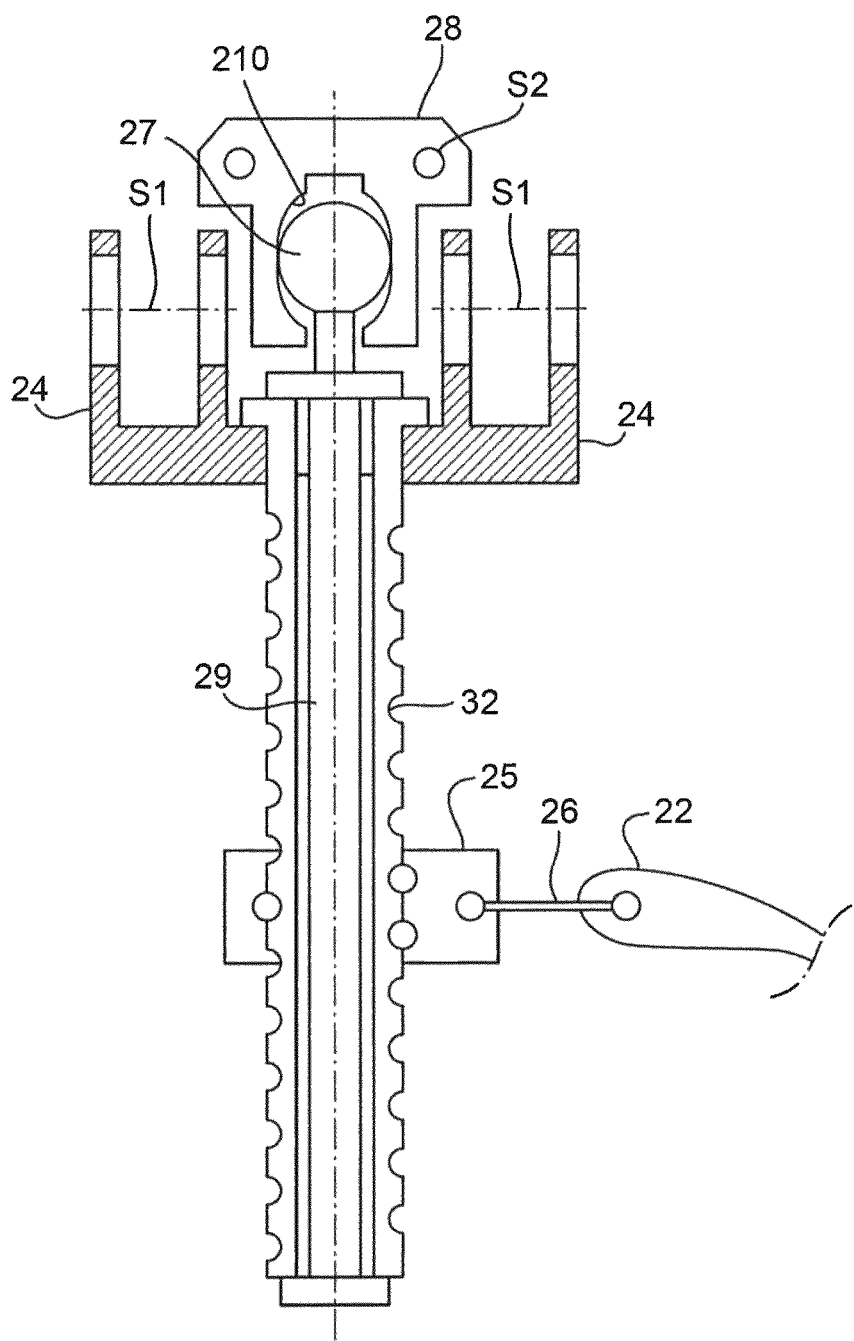
FIG. 1 shows a trimmable horizontal stabiliser actuator arranged to provide control of a flight control surface.
Figure 2:
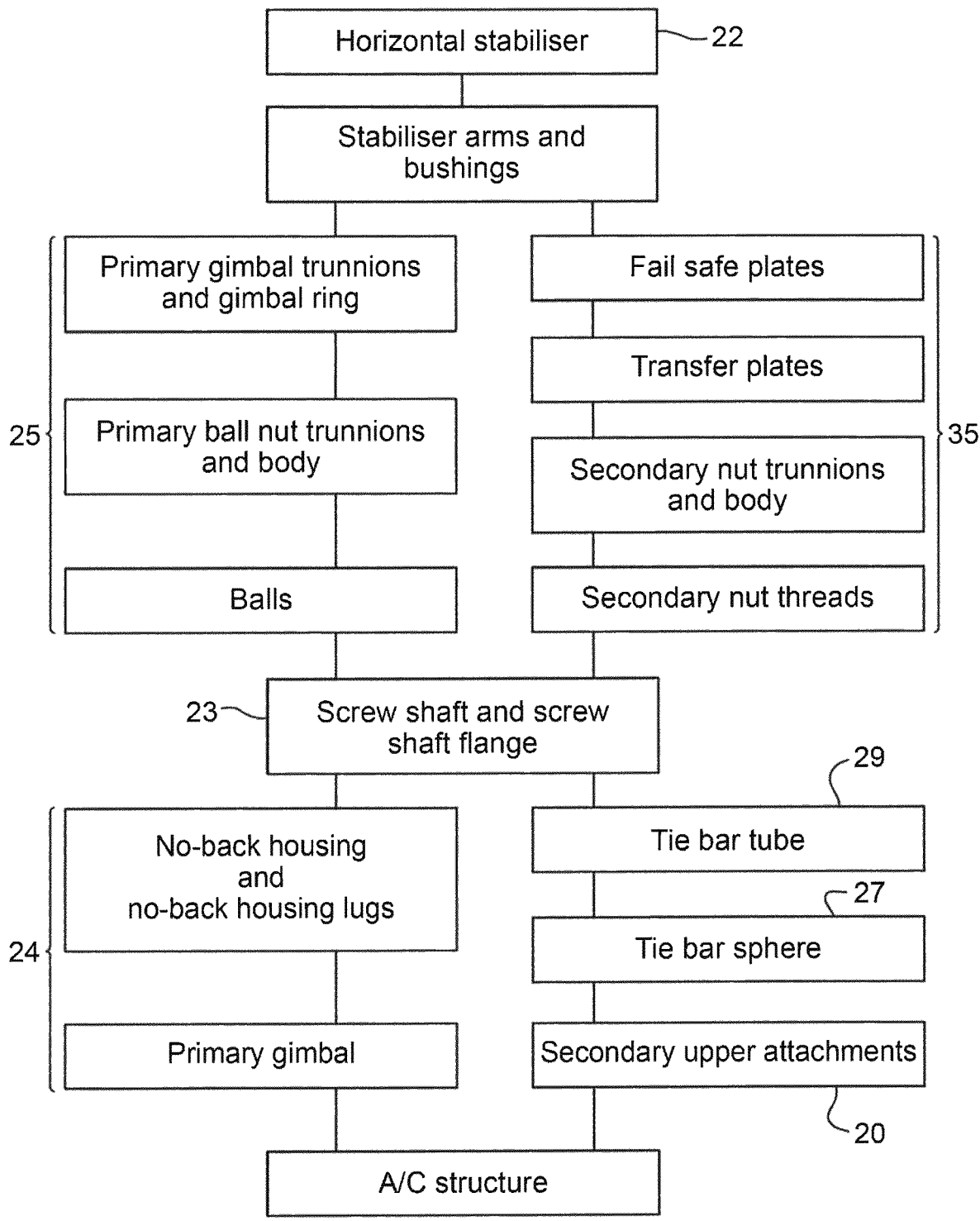
FIG. 2 shows a schematic of primary and secondary load paths.
Figure 3A:
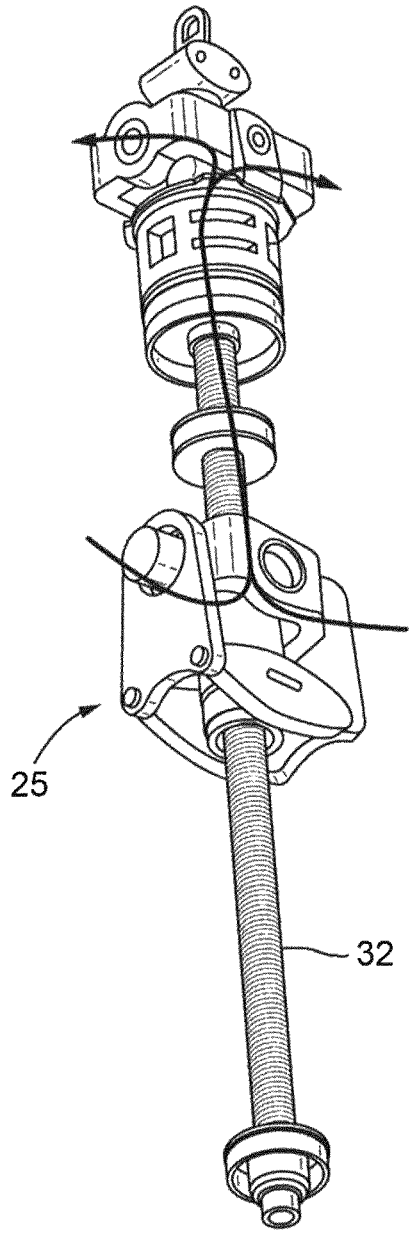
FIG. 3A shows a primary load path through a THSA.
Figure 3B:
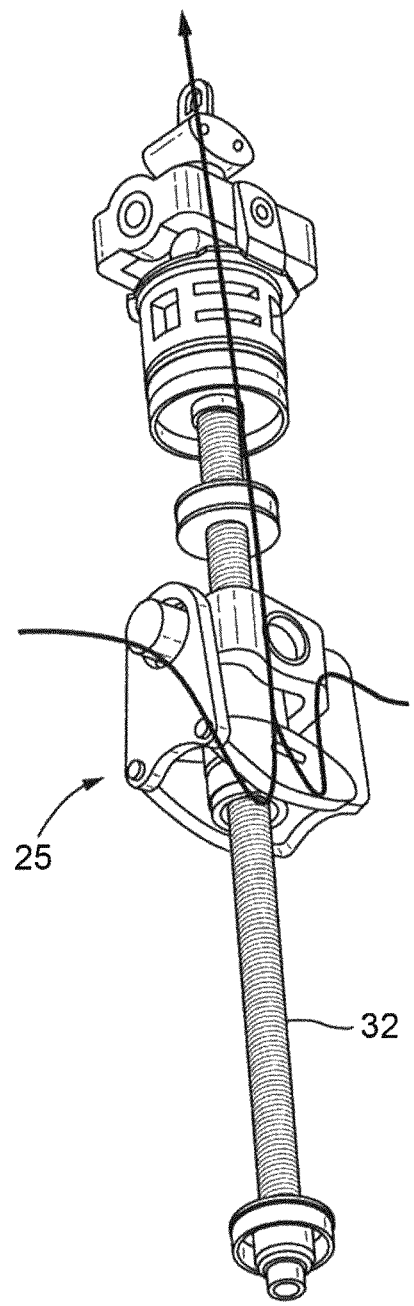
FIG. 3B shows a secondary load path through the THSA of FIG. 3A.
Figure 6:
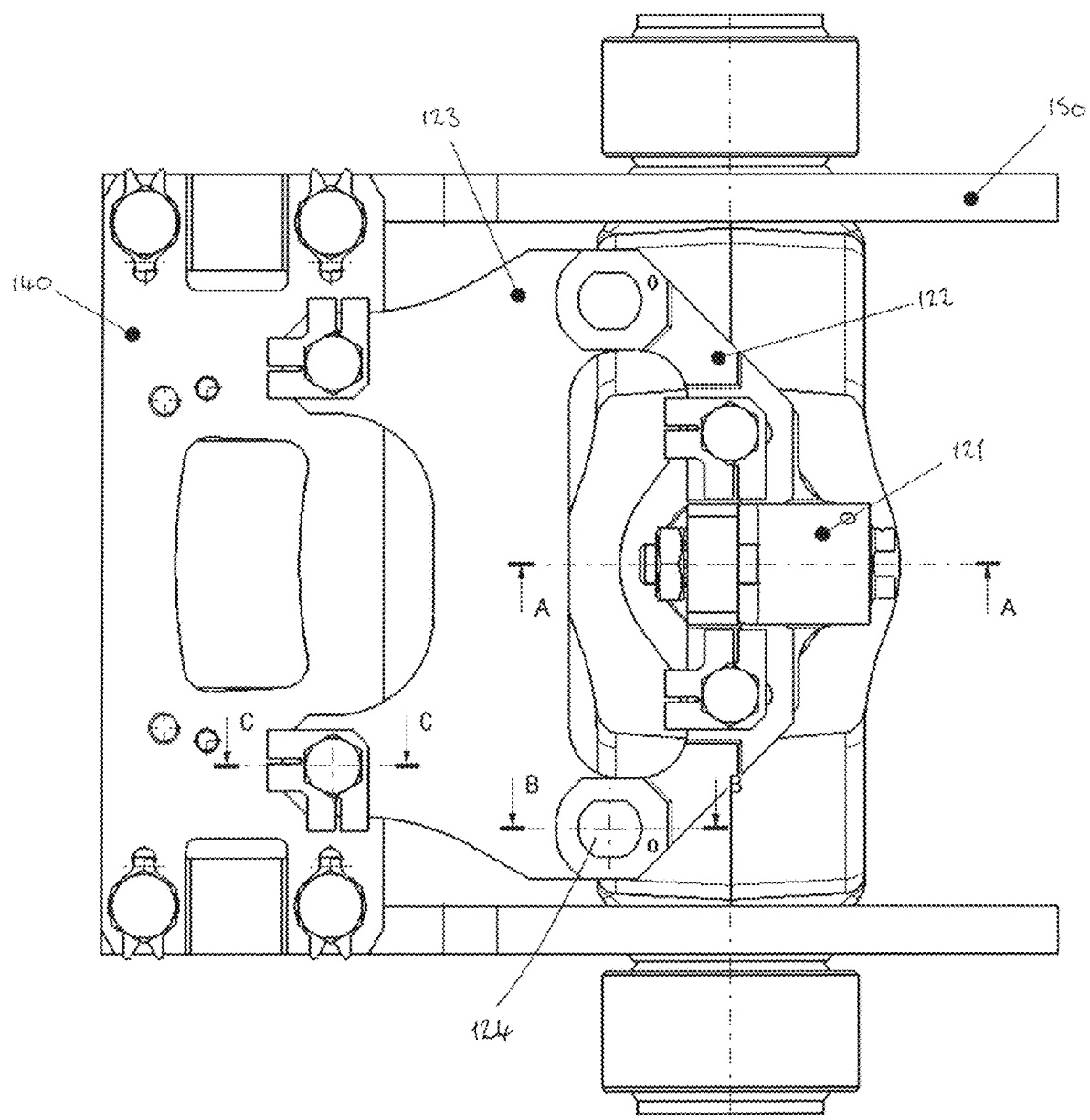
FIG. 6 shows another profile view of the lower attachment system of FIG. 4.

FIG. 6 shows the screw mount 121, screw 125 and coupling portion 122 of the sheet plate 120. These parts are used to fix the relative position between the primary load path and secondary load path. The secondary connection 140 and failsafe plate 150 are secondary load path parts.

Figure 7:
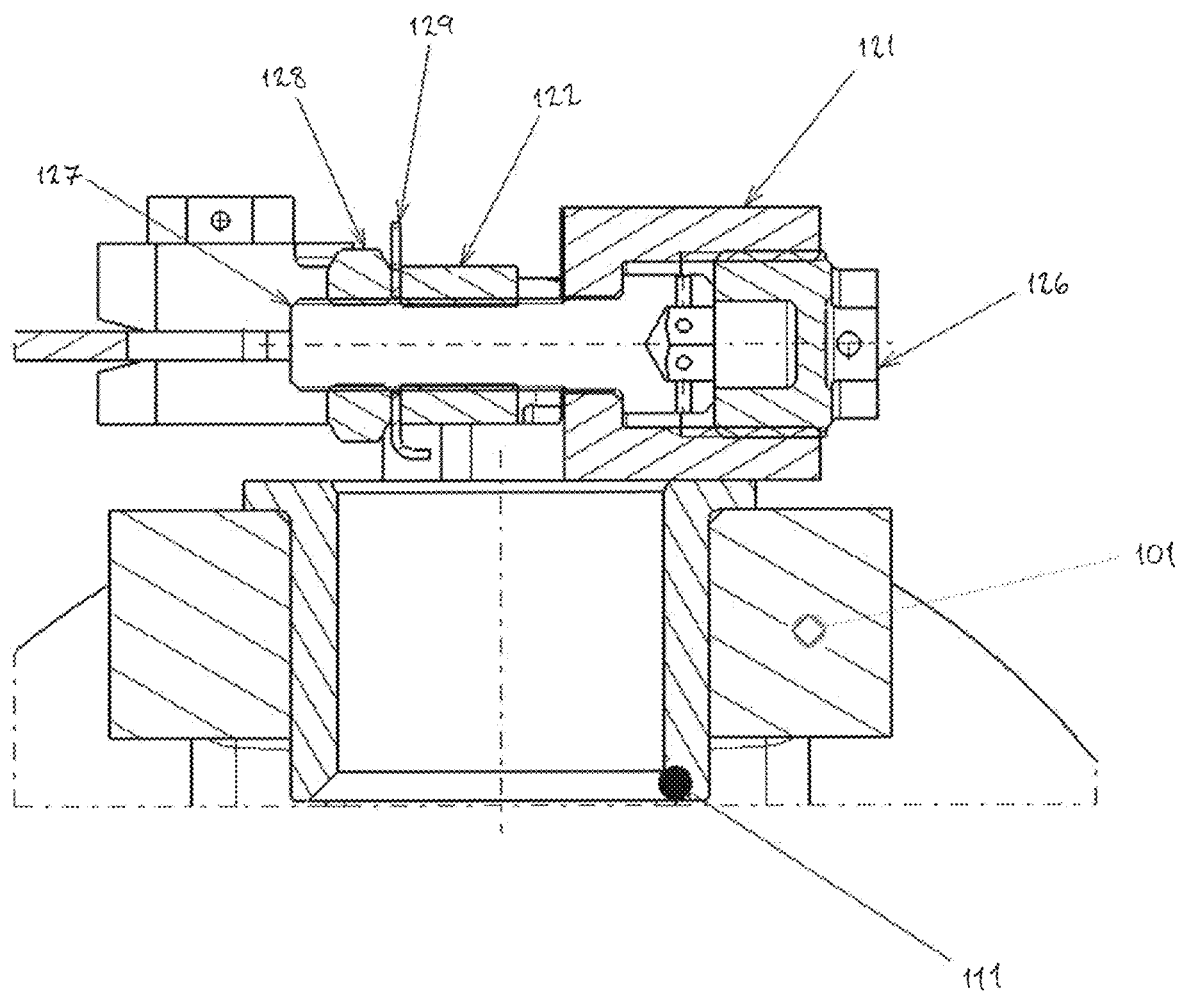
FIG. 7 shows a cross section of the line A-A of FIG. 6.

FIG. 7 shows the screw mount 121 which mounts the screw 125 to ballnut 101. Size and position fixing means 126 and 127 fix the size and/or position of sheet plate 120 in a first direction. A size and position fixing means 128 fixes the size and/or position of sheet plate 120 in a second direction. A locking means 129 locks the size and position fixing means 128 in a desired position. The coupling means 122 provides adjustment by changing the size and/or position of sheet plate 120 through a thread e.g. cooperating with the screw 125 in the screw mount 121. In normal use, the ballnut 101 forms part of the primary load path together with a primary load path component 111.

Figure 8:
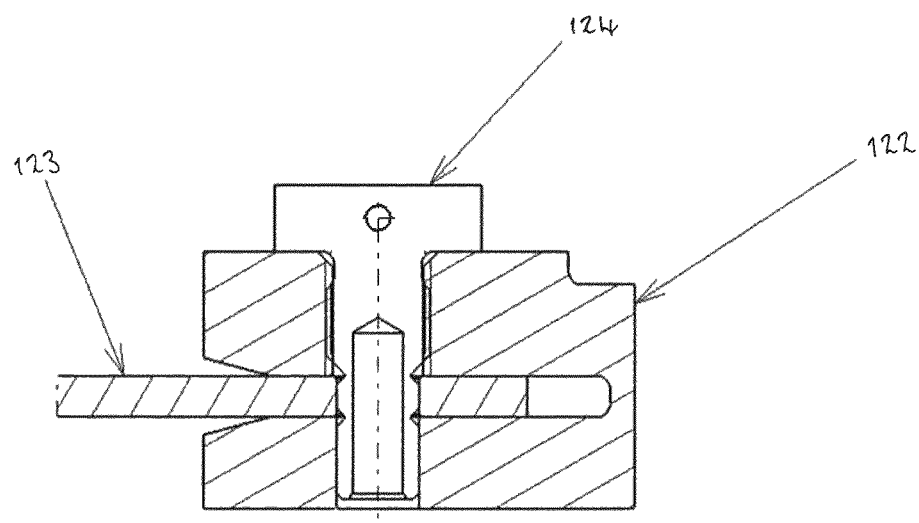
FIG. 8 shows a cross section of the line B-B of FIG. 6.

FIG. 8 shows a cross section along the line B-B of FIG. 6. The sheet portion 123 is coupled to the coupling portion 122 by the fuse pin 124, which disconnects the two parts of the sheet plate 120 when the primary load path fails.

Figure 9:
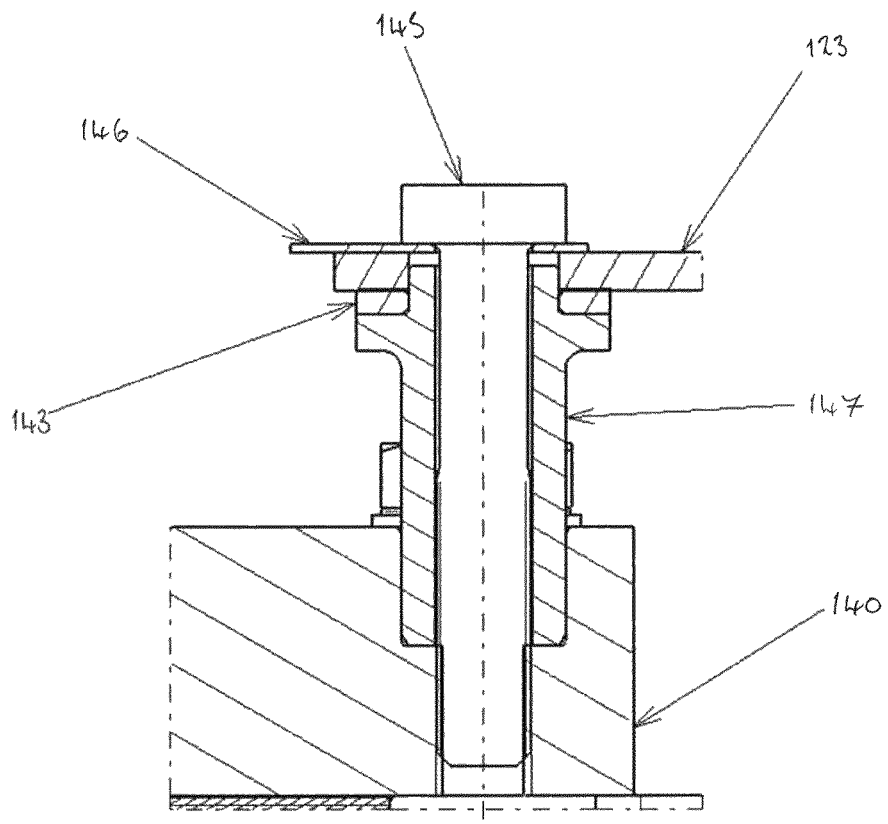
FIG. 9 shows a cross section of the line C-C of FIG. 6.

FIG. 9 shows a cross section along the line C-C of FIG. 6. A fixing 145 fixes the sheet plate 120 to the secondary connection 140. A locking means 146 locks the fixing 145 in a desired position. An adjustment means 143 adjusts the size and/or position of sheet plate 120 through adjustment means 147 and secondary connection 140.

FIG. 10 shows another view of the lower attachment system 25, and FIG. 11 shows a cross section of FIG. 10. The sheet plate 120 is coupled between the ballnut 101 and the secondary connection 140, with its size and/or position adjustable.

The invention claimed is:

1. A lower attachment system for a trimmable horizontal stabiliser actuator comprising:
    a ballnut for being disposed on a screwshaft of the actuator and forming a part of a primary load path of the lower attachment system;
    a trunnion connected to the ballnut and forming a part of the primary load path of the lower attachment system;
    a failsafe plate disposed about the trunnion and forming a part of a secondary load path;
    a secondary connection connected to the failsafe plate and forming a part of the secondary load path;
    a sheet plate attached to a first mounting point on the secondary connection and a second mounting point on the ballnut; and
    an adjustment mechanism provided with the sheet plate for adjusting the size of the sheet plate to adapt it to fit a distance between the first and second mounting points.

2. A lower attachment system as claimed in claim 1, wherein the adjustment mechanism comprises:
    a coupling portion for coupling to a sheet portion of the sheet plate; and
    a screw mounted to the ballnut at the second mounting point and arranged to adjust the position of the coupling portion to adjust the size or position of the sheet plate.

3. A lower attachment system as claimed in claim 1, wherein the adjustment mechanism comprises:
    a coupling portion for coupling to a sheet portion of the sheet plate; and
    a screw mounted to the secondary connection at the first mounting point and arranged to adjust the position of the coupling portion to adjust the size or position of the sheet plate.

4. A lower attachment system as claimed in claim 1, wherein the adjustment mechanism comprises a locking mechanism for preventing changes to the size or position of the sheet plate after adjustment of the sheet plate to fit between the first and second mounting points.

5. A lower attachment system as claimed in claim 1, wherein the sheet plate is arranged to break in case of a failure of the primary load path.

6. A lower attachment system as claimed in claim 1, comprising a fuse pin coupling the sheet plate and arranged to break in case of a failure of the primary load path.

7. A lower attachment system as claimed in claim 1, wherein a part of the secondary load path is and arranged to bear against the secondary connection in case of a failure of the primary load path.

8. A trimmable horizontal stabiliser actuator comprising a lower attachment system as claimed in claim 1.

9. A method of installing a sheet plate of a lower attachment system for a trimmable horizontal stabiliser actuator as claimed in claim 1, the method comprising:
- coupling the sheet plate to the ballnut at the second mounting point and/or to the secondary connection at the first mounting point; and
- adjusting the adjustment mechanism to adjust the size or position of the sheet plate to adapt it to fit the distance between the first and second mounting points.

10. A method as claimed in claim 9, further comprising locking the adjustment mechanism to prevent further adjustment of the sheet plate.

\* \* \* \* \*